(12) United States Patent
Neubauer et al.

(10) Patent No.: US 12,206,140 B2
(45) Date of Patent: Jan. 21, 2025

(54) FUEL CELL SYSTEM AND METHOD FOR CONTROLLING THE TEMPERATURE OF A FUEL CELL SYSTEM

(71) Applicant: AVL List GmbH, Graz (AT)

(72) Inventors: Raphael Neubauer, Graz (AT); Thomas Strasser-Krauss, Graz (AT); Michael Seidl, Vienna (AT)

(73) Assignee: AVL List GmbH, Graz (AT)

( * ) Notice: Subject to any disclaimer, the term of this patent is extended or adjusted under 35 U.S.C. 154(b) by 39 days.

(21) Appl. No.: 17/295,893

(22) PCT Filed: Nov. 21, 2019

(86) PCT No.: PCT/AT2019/060396
§ 371 (c)(1),
(2) Date: May 21, 2021

(87) PCT Pub. No.: WO2020/102841
PCT Pub. Date: May 28, 2020

(65) Prior Publication Data
US 2022/0131166 A1    Apr. 28, 2022

(30) Foreign Application Priority Data
Nov. 21, 2018 (AT) .............................. A 51022/2018

(51) Int. Cl.
*H01M 8/0432* (2016.01)
*H01M 8/04007* (2016.01)
(Continued)

(52) U.S. Cl.
CPC ... *H01M 8/04373* (2013.01); *H01M 8/04022* (2013.01); *H01M 8/04074* (2013.01);
(Continued)

(58) Field of Classification Search
None
See application file for complete search history.

(56) References Cited

U.S. PATENT DOCUMENTS

2018/0123150 A1    5/2018  Bozzolo
2019/0372136 A1*  12/2019  Sato ................ H01M 8/04302

FOREIGN PATENT DOCUMENTS

DE    102005001361    7/2006
EP    2824743         1/2015
(Continued)

OTHER PUBLICATIONS

English translation of DE 10 2005 001361 to Kaupert (Year: 2005).*
(Continued)

*Primary Examiner* — Lucas J. O'Donnell

(57) ABSTRACT

The present invention relates to a fuel cell system (1a; 1b; 1c; 1d) comprising: at least one fuel cell stack (2) with an anode portion (3) and a cathode portion (4); a reformer-heat exchanger (5) with a cold side which is upstream of the anode portion (3) and forms a reformer (6) and a hot side which is downstream of the cathode portion (4) and forms a heat exchanger (7); and an afterburner (8) downstream of the heat exchanger (7) for combusting anode exhaust gas from the anode portion (3) and/or cathode exhaust gas from the cathode portion (4), the heat exchanger (7) being situated directly downstream of the cathode portion (4) and being in fluid communication with the cathode portion (4) by means of a cathode exhaust gas line (9) in order for the cathode exhaust gas to be fully conducted through the heat exchanger (7). The invention also relates to a method for controlling the temperature of a fuel cell system (1a; 1b; 1ce; 1d) according to the invention.

8 Claims, 3 Drawing Sheets

(51) Int. Cl.
*H01M 8/04014* (2016.01)
*H01M 8/04223* (2016.01)
*H01M 8/04701* (2016.01)
H01M 8/04746 (2016.01)

(52) U.S. Cl.
CPC ... *H01M 8/04268* (2013.01); *H01M 8/04738* (2013.01); *H01M 8/04776* (2013.01); *H01M 2250/20* (2013.01)

(56) References Cited

FOREIGN PATENT DOCUMENTS

| WO | WO 03/107463 | 12/2003 |
|---|---|---|
| WO | WO 2018/189375 | 10/2018 |
| WO | WO 2020/102841 | 5/2020 |

OTHER PUBLICATIONS

Internationaler Recherchenbericht und Schriftlicher Bescheid [International Search Report and the Written Opinion] Dated Feb. 13, 2020 From the International Searching Authority Re. Application No. PCT/AT2019/060396 and Its Translation of Search Report Into English. (13 Pages).

* cited by examiner

FUEL CELL SYSTEM AND METHOD FOR CONTROLLING THE TEMPERATURE OF A FUEL CELL SYSTEM

RELATED APPLICATIONS

This application is a National Phase of PCT Patent Application No. PCT/AT2019/060396 having International filing date of Nov. 21, 2019, the which of claims benefit priority of Austrian Patent Application No. A 51022/2018 filed on Nov. 21, 2018. The contents of the above applications are all incorporated by reference as if fully set forth herein in their entirety.

FIELD AND BACKGROUND OF THE INVENTION

The present invention relates to a fuel cell system, in particular in the form of an SOFC system, comprising at least one fuel cell stack with an anode portion and a cathode portion, a reformer-heat exchanger with a cold side upstream of the anode portion which forms a reformer, and a hot side downstream of the cathode portion which forms a heat exchanger, and an afterburner downstream of the heat exchanger for combusting anode exhaust gas from the anode portion and/or cathode exhaust gas from the cathode portion. The invention further relates to a method for controlling the temperature of a fuel cell system of this generic type.

In SOFC systems of this generic type, a reformer is arranged upstream of the anode portion through which fuel or a fuel mixture is reformed in order then to feed it to the anode portion. In order for the reformer to operate efficiently, this must be brought to or kept at a particular operating temperature. Various different approaches are known in order to achieve this. According to one approach, a heat exchanger is arranged on the reformer. More specifically, the reformer is in this case designed as a reformer-heat exchanger in which the cold side of the reformer-heat exchanger forms the reformer and the hot side of the reformer-heat exchanger forms the heat exchanger. The heat exchanger can in this case be arranged downstream of the cathode portion, so that the reformer can be temperature-controlled or heated by means of heated cathode exhaust gas.

Since the cathode exhaust gas directly downstream of the cathode portion has a relatively high temperature, in known systems it is not fed to the hot side of the reformer-heat exchanger fully, or at least not directly. This is associated with a corresponding complexity with regard to the channelling of the fluid, for example with the aid of flow dividers, and the temperature management downstream of the cathode portion.

SUMMARY OF THE INVENTION

It is the object of the present invention to take into account, at least partially, the problems described above. In particular, it is the object of the present invention to make available a fuel cell system as well as a method providing, or allowing, an improved temperature management for controlling the temperature of the reformer.

The above object is achieved through the claims. In particular, the above object is achieved through the fuel cell system and the method according to the present invention. Further advantages of the invention are explained in the dependent claims, the description and the drawings. Features and details which are described in connection with the fuel cell system naturally also apply in connection with the fuel cell system according to the invention, the use according to the invention and vice versa, so that with regard to the disclosure, mutual reference can always be made to the individual aspects of the invention.

According to a first aspect of the present invention, a fuel cell system is provided comprising at least one fuel cell stack with an anode portion and a cathode portion, a reformer-heat exchanger with a cold side upstream of the anode portion which forms a reformer, and a hot side downstream of the cathode portion which forms a heat exchanger, and an afterburner downstream of the heat exchanger for combusting anode exhaust gas from the anode portion and/or cathode exhaust gas from the cathode portion. The heat exchanger is situated and/or arranged directly downstream of the cathode portion and is in fluid communication with the cathode portion by means of a cathode exhaust gas line in order for the cathode exhaust gas to be fully conducted through the heat exchanger.

The fuel cell system corresponds in particular to a high temperature fuel cell system and preferably an SOFC system. In such systems, it has previously been assumed that the operating temperatures in the at least one fuel cell stack are too high in order to feed cathode exhaust gas from the cathode portion directly into a heat exchanger of the generic type downstream of the at least one fuel cell stack on the reformer during the operation of the fuel cell system. More specifically, it has previously been assumed that such a configuration would have too great a negative influence on the reformer-heat exchanger. For this reason, the cathode exhaust gas downstream of the cathode portion has in the past either been at least partially branched off before being fed to the heat exchanger or cooled by means of further heat exchangers before being fed to the heat exchanger on the reformer.

However, in extensive experiments conducted in connection with the present invention it has transpired, surprisingly, that weighing up various different factors it is in fact possible, and can also be advantageous, to conduct the cathode exhaust gas fully to the heat exchanger on the reformer or the hot side of the reformer-heat exchanger. Firstly, it is advantageous that no flow dividers are necessary downstream of the cathode portion. Flow dividers lead to a complex system configuration requiring correspondingly complex functional components. Not only are these expensive, they are also reflected in the weight, which should always be reduced, in particular in mobile applications. In addition, the use of flow dividers means that complex control and regulation steps need to be implemented in the fuel cell system. These can be dispensed with if the cathode exhaust gas from the cathode portion is conducted directly and without branching, i.e. fully, to the heat exchanger on the reformer.

Without flow dividers downstream of the cathode portion and upstream of the heat exchanger, it is moreover possible to regulate the entire fuel cell system solely via the supply of air or supply of cathode gas to the cathode portion. In a fuel cell system according to the invention, the supply of fuel gas or anode gas can be fixed, depending on a desired power to be tapped from the fuel cell stack, whereas only the quantity of air or oxygen for the cathode portion is varied.

According to the invention, the afterburner is arranged separately from and at a distance from the reformer-heat exchanger. Air or an oxygen-containing fluid is fed to the afterburner for combustion. In the reformer-heat exchanger according to the invention, a supply of air to or on the reformer can be dispensed with. The afterburner can for example be designed as a flame burner or as a catalytic burner.

Optionally, it can be favourable to supply air to the reformer when starting up the fuel cell system, that is to say during a start-up phase of the fuel cell system.

The reformer-heat exchanger is preferably designed in the form of a plate heat exchanger, whereby the cold side forming the reformer can be catalytically coated. However, fundamentally the reformer-heat exchanger can be of any design, for example as a shell-and-tube heat exchanger. It can also be favourable if both the cold side and also the hot side of the reformer-heat exchanger is catalytically coated. This allows a temperature level in the reformer-heat exchanger to be regulated directly, for example if air is also supplied during operation.

The arrangement of the heat exchanger directly downstream of the cathode portion is understood to mean that no functional components, such as further heat exchangers, flow dividers, valves or the like, are arranged in the flow direction from the cathode portion to the heat exchanger. Due to the fact that the cathode exhaust gas line is designed to conduct the cathode exhaust gas fully from the cathode portion to, or through, the heat exchanger, the cathode exhaust gas can be conducted fully to the heat exchanger without being branched off beforehand or in the meantime.

According to a further embodiment of the present invention, it is possible that a start-up burner is provided for the adjustable supply of a heating fluid to the afterburner, whereby the afterburner is arranged upstream of a hot side of a cathode gas heat exchanger, the cold side of which is arranged upstream of the cathode portion in a cathode supply gas line for feeding cathode supply gas to the cathode portion. In a fuel cell system according to the invention, the operating temperature of cathode exhaust gas at the output of the at least one fuel cell stack lies within a range from approx. 550° C., in particular approx. 600° C. to approx. 620° C. A temperature of approx. 500° C., in particular approx. 520° C. to approx. 540° C. should be achieved at the heat exchanger. In the event that the temperature of the cathode exhaust gas is not sufficient in order to heat up the heat exchanger to the desired temperature, heat can be introduced to the cathode portion in a measured or controlled manner through the heat exchanger. More specifically, in this case the heating fluid is first conducted through the start-up burner to the afterburner. The heating fluid can thereby be conducted into or at least up to the afterburner. From the afterburner, the heating fluid can be conducted further in the direction of the hot side of the cathode gas heat exchanger in order there to heat up cathode supply gas, in particular air, which is fed to the cathode portion. As a result, the cathode portion and later the heat exchanger on the reformer are heated up accordingly. Consequently, the arrangement of the start-up burner on the afterburner allows several system components of the fuel cell system to be heated up in a simple manner. This can in particular be advantageous during start-up operation of the fuel cell system.

Within the context of the invention, heating fluid is understood to mean a gaseous and/or liquid fluid, in particular fuel combusted beforehand, at least partially, in the start-up burner, preferably with the supply of air.

It is also possible, in a fuel cell system according to the invention, that a cathode exhaust gas start-up burner is provided for the adjustable supply of a heating fluid into the cathode exhaust gas line. A desired increase in temperature in the heat exchanger on the reformer can be realised directly and quickly through the addition of heating fluid into the cathode exhaust gas line. Heat losses can largely be avoided.

It is also possible that in a fuel cell system according to the present invention a cathode supply gas line for the supply of cathode supply gas to the cathode portion is provided upstream of the cathode portion and a cathode supply gas start-up burner for the adjustable supply of a heating fluid into the cathode supply gas line is provided. The cathode supply gas start-up burner is thus arranged directly upstream of the cathode portion and it is possible to react correspondingly quickly to desired temperature increases in the cathode portion.

According to a further aspect of the present invention, a method for controlling the temperature of a fuel cell system as described in detail above is suggested. The method comprises the following steps:

feeding cathode supply gas through the cathode supply gas line to the cathode portion, and feeding all of the cathode exhaust gas downstream of the cathode portion through the cathode exhaust gas line directly to the heat exchanger.

A method according to the invention thus brings with it the same advantages as described in detail with reference to the fuel cell system according to the invention. According to the invention, the fuel cell system is operated with a cathode output temperature of below 700° C., in particular with a cathode output temperature of approx. 560° C., in particular approx. 600° C. to approx. 620° C. This temperature range has proved to be an advantageous compromise between sufficiently hot for the at least one fuel cell stack and not too hot for the cathode exhaust gas for the heat exchanger on the reformer. This means the fuel cell system can, at least during normal operation, be operated with a preferred reformer-heat exchanger temperature of approx. 500° C. to approx. 560° C., in particular with a reformer-heat exchanger temperature of approx. 520° C. to approx. 540° C.

The method according to the invention allows the fuel cell system to be regulated solely through the supply of air to the cathode portion, as already mentioned above. That is to say, in a method according to the present invention the supply of the cathode supply gas, in particular exclusively the supply of the cathode supply gas, is regulated in order to regulate the temperature in the fuel cell system. To this end, at least one temperature sensor can be provided in order to determine at least one temperature in the fuel cell system. If it is detected that the determined temperature lies below or above a predefinable threshold value, the quantity of cathode supply gas is regulated accordingly. This makes it possible to make available a simple and economical temperature management for the fuel cell system.

In addition, in a method according to the invention, when controlling the temperature of the fuel cell system, depending on a determined temperature of the reformer, heating fluid can be conducted through the start-up burner to the afterburner and on from there to the hot side of the cathode heat exchanger, the cold side of which is arranged upstream of the cathode portion in the cathode supply gas line. In addition or alternatively, it is possible that, when controlling the temperature of the fuel cell system, depending on a determined temperature of the reformer, heating fluid is fed through the cathode exhaust gas start-up burner into the cathode exhaust gas line and/or through the cathode supply gas start-up burner into the cathode supply gas line. In this way, the advantages, already described above, in terms of a fast and direct regulation of the temperature of the desired functional components can be achieved.

A further aspect of the present invention comprises the use of a fuel cell system as described above to provide electrical energy in a motor vehicle. Thus, the use according to the invention also brings with it the advantages described above.

BRIEF DESCRIPTION OF THE SEVERAL VIEWS OF THE DRAWINGS

Further measures improving the invention are explained in the following description of different exemplary embodiments of the invention, which are represented schematically in the figures. In each case schematically.

DESCRIPTION OF SPECIFIC EMBODIMENTS OF THE INVENTION

In FIGS. 1 to 4, elements with the same function and mode of action are given the same reference signs.

Figure 1:
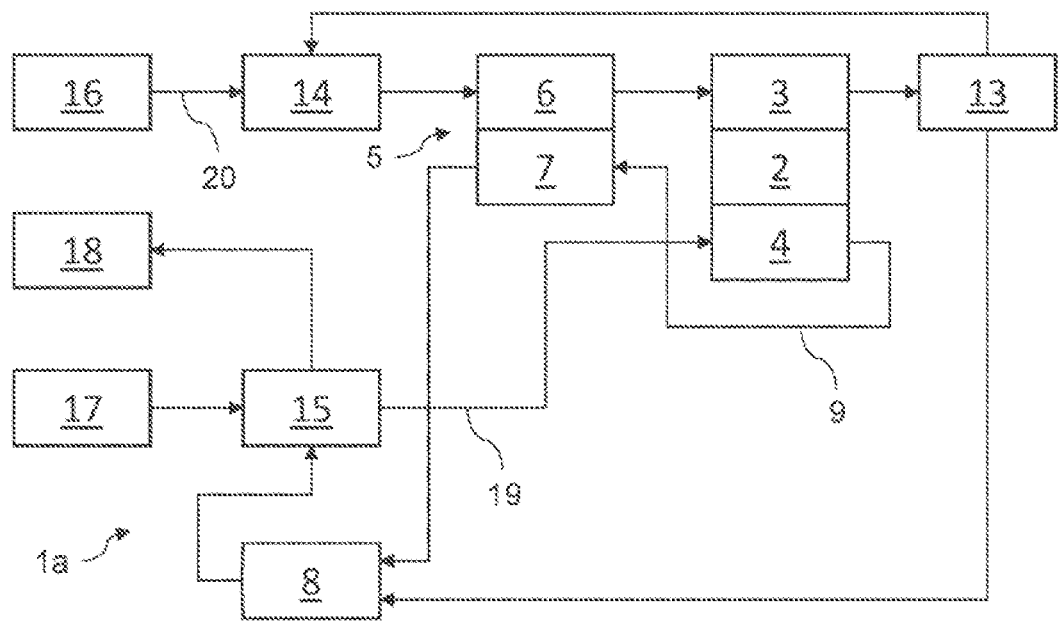
FIG. 1 shows a block diagram representing a fuel cell system according to a first embodiment of the present invention.

FIG. 1 shows a block diagram of a fuel cell system 1a in the form of an SOFC system according to a preferred embodiment. The fuel cell system 1a illustrated in FIG. 1 is a fuel cell stack 2 with an anode portion 3 and a cathode portion 4. The fuel cell system 1a also has a reformer-heat exchanger 5 with a cold side upstream of the anode portion 3 which forms a reformer 6 and a hot side downstream of the cathode portion 4 which forms a heat exchanger 7. In other words, the reformer 6 forms the cold side of the reformer-heat exchanger 5 and the heat exchanger 7 forms the hot side of the reformer-heat exchanger 5. According to the illustrated variant, the reformer-heat exchanger 5 is designed as a plate heat exchanger in which the reformer 6 is catalytically coated.

The fuel cell system 1a also has an afterburner 8 downstream of the heat exchanger 7 for combusting anode exhaust gas from the anode portion 3 and/or cathode exhaust gas from the cathode portion 4. As can be seen in FIG. 1, the heat exchanger 7 is situated directly downstream of the cathode portion 4 and is in fluid communication with the cathode portion 4 by means of a cathode exhaust gas line 9 in order for the cathode exhaust gas to be conducted fully to or through the heat exchanger 7.

Directly downstream of the anode portion 3 is a branch section 13 for branching off a part of the anode exhaust gas into the afterburner 8 as well for branching off or returning another part of the anode exhaust gas to a fork section 14 through which the anode exhaust gas can be fed back into an anode supply gas line 20.

Anode supply gas in the form of a fuel or a fuel mixture can be conducted through the anode supply gas line 20 from an anode supply gas source 16 via the fork section 14 and the reformer 6 to the anode portion. Cathode supply gas in the form of air can be conducted from a cathode supply gas source 17 via the cathode gas heat exchanger 15 or its cold side through the cathode supply gas line 19 to the cathode portion. Exhaust gas, or at least partially consumed process gas, can be conducted, via the afterburner 8 and the hot side of the cathode gas heat exchanger 15, through a fluid outlet 18 into the surroundings of the fuel cell system 1a.

Figure 2:
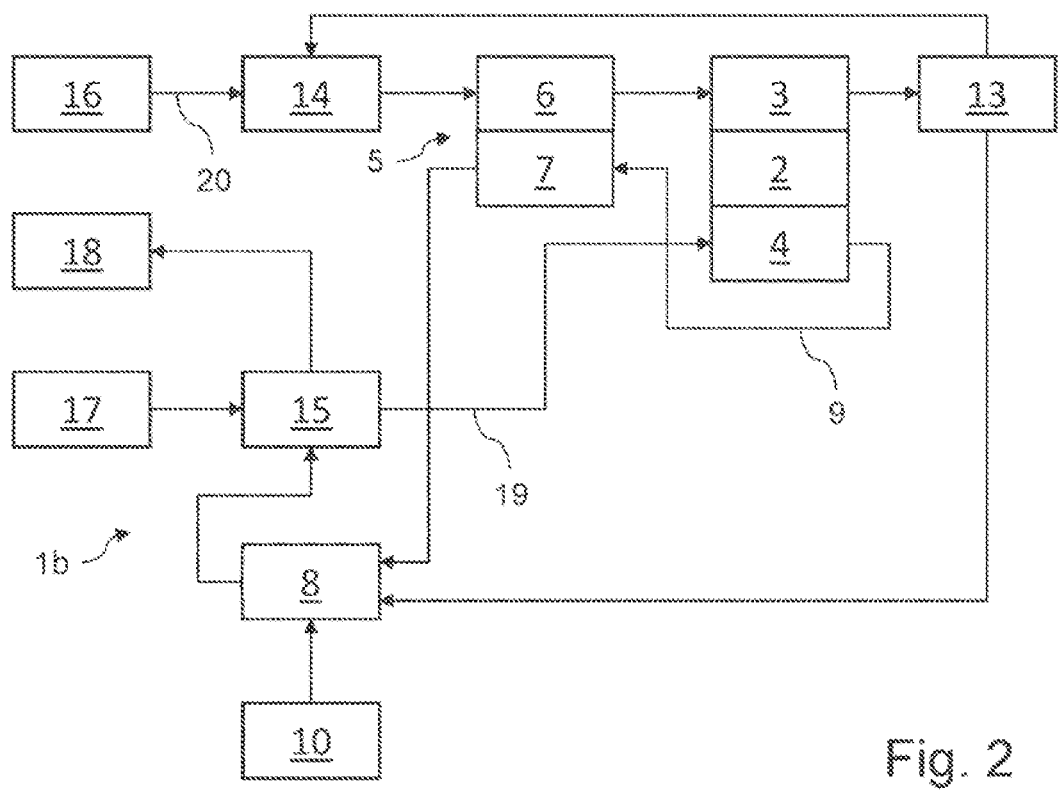
FIG. 2 shows a block diagram representing a fuel cell system according to a second embodiment of the present invention.

FIG. 2 shows a fuel cell system 1b according to a second embodiment. The fuel cell system 1b illustrated in FIG. 2 corresponds substantially to the fuel cell system 1a illustrated in FIG. 1 and differs in having a start-up burner 10 for the adjustable supply of a heating fluid to the afterburner 8. With the aid of the start-up burner 10, the afterburner 8 can be heated up, directly or substantially directly, and the cathode gas heat exchanger 15, the cathode portion 4 as well as adjacent functional components can be heated up indirectly to a desired operating temperature.

Figure 3:
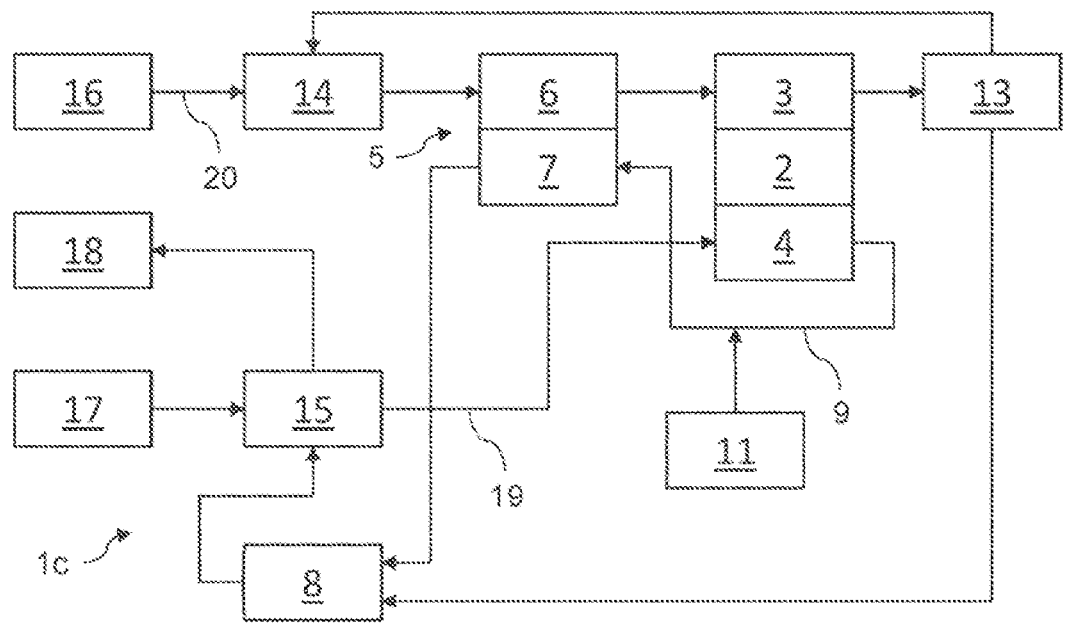
FIG. 3 shows a block diagram representing a fuel cell system according to a third embodiment of the present invention.

FIG. 3 shows a fuel cell system 1c according to a third embodiment. The fuel cell system 1c illustrated in FIG. 3 corresponds substantially to the fuel cell system 1a illustrated in FIG. 1 and differs in having a cathode exhaust gas start-up burner 11 for the adjustable supply of a heating fluid into the cathode exhaust gas line 9. By means of the cathode exhaust gas start-up burner 11, the heat exchanger 7 can be heated up, directly or substantially directly, and the afterburner 8, the cathode gas heat exchanger 15 as well as adjacent functional components can be heated up indirectly to a desired operating temperature.

Figure 4:
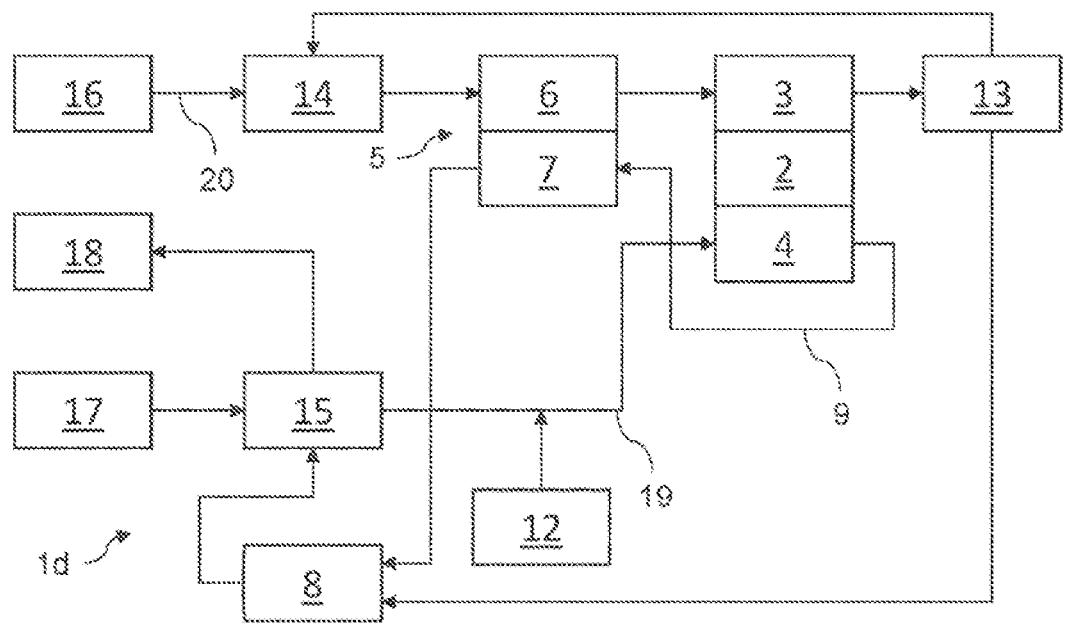
FIG. 4 shows a block diagram representing a fuel cell system according to a fourth embodiment of the present invention.

FIG. 4 shows a fuel cell system 1d according to a fourth embodiment. The fuel cell system 1d illustrated in FIG. 4 corresponds substantially to the fuel cell system 1a illustrated in FIG. 1 and differs in having the cathode supply gas start-up burner 12 for the adjustable supply of a heating fluid into the cathode supply gas line 19. By means of the cathode supply gas start-up burner 12, the cathode portion 4 can be heated up, directly or substantially directly, and the heat exchanger 7, the afterburner 8, the cathode gas heat exchanger 15 as well as adjacent functional components can be heated up indirectly to a desired operating temperature.

Figure 5:
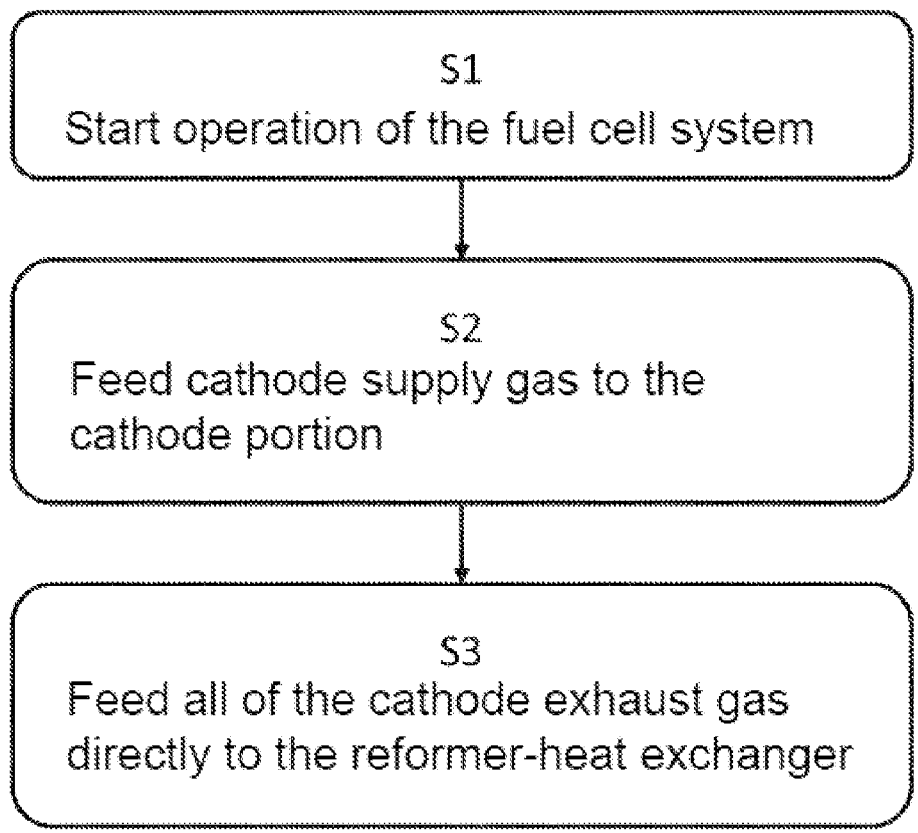
FIG. 5 shows a flow chart explaining a method according to an embodiment of the invention.

A method for controlling the temperature of a fuel cell system 1a as represented in FIG. 1 is now described with reference to FIG. 5. In a first step S1, the operation of the fuel cell system 1a is first started. To this end, according to a second step S2 cathode supply gas in the form of air is conducted through the cathode supply gas line 19 via the cold side of the cathode gas heat exchanger 15 to the cathode portion 4. In a third step S3 the entire cathode exhaust gas downstream of the cathode portion 4 is conducted through the cathode exhaust gas line 9 directly to the heat exchanger 7. According to the method, the temperature in the fuel cell system 1a can be regulated, at least periodically, solely by regulating the supply of the cathode supply gas to the cathode portion 4.

In addition to the embodiments described, the invention allows further design principles. That is to say, the invention should not be considered to be limited to the exemplary embodiments explained to with reference the drawings. For example, when controlling the temperature of the fuel cell system 1b, depending on a determined temperature of the reformer 6, heating fluid can be fed through the start-up burner 10 to the afterburner 8 and onwards from there to the hot side of the cathode heat exchanger 15, the cold side of which is arranged upstream of the cathode portion 4 in the cathode supply gas line 19. It is also possible that, when controlling the temperature of the fuel cell system 1c, depending on a determined temperature of the reformer 6, heating fluid can be fed through the cathode exhaust gas start-up burner 11 into the cathode exhaust gas line 9. In addition, when controlling the temperature of the fuel cell system 1d, depending on a determined temperature of the reformer 6, heating fluid can be fed through the cathode supply gas start-up burner 12 into the cathode supply gas line 19. The start-up burners 10, 11, 12 represented in FIGS. 2 to 4 can be used together in any combination in a single embodiment.

LIST OF REFERENCE SIGNS 1a-1d fuel cell system
2 fuel cell stack
3 anode portion
4 cathode portion
5 reformer-heat exchanger
6 reformer
7 heat exchanger
8 afterburner
9 cathode exhaust gas line
10 start-up burner
11 cathode exhaust gas start-up burner
12 cathode supply gas start-up burner
13 branch section
14 fork section
15 cathode gas heat exchanger
16 anode supply gas source
17 cathode supply gas source
18 fluid outlet
19 cathode supply gas line
20 anode supply gas line

The invention claimed is:

1. A fuel cell system (1a; 1b; 1c; 1d) comprising:
at least one fuel cell stack (2) with an anode portion (3) and a cathode portion (4),
a reformer-heat exchanger (5) with a cold side upstream of the anode portion (3) which forms a reformer (6),
a hot side downstream of the cathode portion (4) which forms a heat exchanger (7), and an afterburner (8) downstream of the heat exchanger (7) for combusting anode exhaust gas from the anode portion (3) and/or cathode exhaust gas from the cathode portion (4), wherein the heat exchanger (7) is situated directly downstream of the cathode portion (4) and is in fluid communication with the cathode portion (4) by means of a cathode exhaust gas line (9) in order for the cathode exhaust gas to be fully conducted through the heat exchanger (7),
a cathode supply gas line (19) for the supply of cathode supply gas to the cathode portion (4) is provided upstream of the cathode portion (4),
a cathode exhaust gas start-up burner (11) and a cathode supply gas start-up burner (12) is provided for the adjustable supply of a heating fluid into the cathode exhaust gas line (9) and the cathode supply gas line (19), and;
an adjustable supply adapted to feed a heating fluid for controlling a temperature of the fuel cell system (1c), wherein the adjustable supply is adapted to feed the heating fluid
(a) through the cathode exhaust gas start-up burner (11) into the cathode exhaust gas line (9), and/or (b) through the cathode supply gas start-up burner (12) into the cathode supply gas line (19) depending on a determined temperature of the reformer (6).

2. The fuel cell system (1b) according to claim 1, wherein a start-up burner (10) is provided for the adjustable supply of a heating fluid to the afterburner (8), wherein the afterburner (8) is arranged upstream of a hot side of a cathode gas heat exchanger (15), the cold side of which is arranged upstream of the cathode portion (4) in a cathode supply gas line (19) for the supply of cathode supply gas to the cathode portion (4).

3. A Method for controlling the temperature of a fuel cell system (1a; 1b; 1c; 1d), the method comprising:
providing at least one fuel cell stack (2) with an anode portion (3) and a cathode portion (4);
providing a reformer-heat exchanger (5) with a cold side upstream of the anode portion (3) which forms a reformer (6), and a hot side downstream of the cathode portion (4) which forms a heat exchanger (7);
providing an afterburner (8) downstream of the heat exchanger (7) for combusting anode exhaust gas from the anode portion (3) and/or cathode exhaust gas from the cathode portion (4);
situating the heat exchanger (7) directly downstream of the cathode portion (4);
fluidly communicating the heat exchanger (7) with the cathode portion (4) by a cathode exhaust gas line (9) in order for the cathode exhaust gas to be fully conducted through the heat exchanger (7);
providing a cathode supply gas line (19) for the supply of cathode supply gas to the cathode portion (4) upstream of the cathode portion (4);
providing a cathode exhaust gas start-up burner (11) and a cathode supply gas start-up burner (12) for the adjustable supply of a heating fluid into the cathode exhaust gas line (9) and the cathode supply gas line (19); and
controlling a temperature of the fuel cell system (1c) by adjustably feeding a heating fluid through (a) the cathode exhaust gas start-up burner (11) into the cathode exhaust gas line (9), and/or (b) the cathode supply gas start-up burner (12) into the cathode supply gas line (19) depending on a determined temperature of the reformer (6).

4. The method according to claim 3, wherein
the supply of the cathode supply gas is regulated in order to regulate the temperature in the fuel cell system (1a).

5. The method according to claim 3,
wherein
when controlling the temperature of the fuel cell system (1b), depending on a determined temperature of the reformer (6), heating fluid is fed through the start-up burner (10) to the afterburner (8) and onwards from there to the hot side of the cathode gas heat exchanger (15), the cold side of which is arranged upstream of the cathode portion (4) in the cathode supply gas line (19).

6. A method of using a fuel cell system (1a; 1b; 1c; 1d) according to claim 1 to provide electrical energy in a motor vehicle.

7. The method according to claim 3, wherein the temperature in the fuel cell system (1a) is regulated solely by regulating the supply of the cathode supply gas.

8. A fuel cell system (1a; 1b; 1c; 1d) comprising:
at least one fuel cell stack (2) with an anode portion (3) and a cathode portion (4),
a reformer-heat exchanger (5) with a cold side upstream of the anode portion (3) which forms a reformer (6), and
a hot side downstream of the cathode portion (4) which forms a heat exchanger (7), and
an afterburner (8) downstream of the heat exchanger (7) for combusting anode exhaust gas from the anode portion (3) and/or cathode exhaust gas from the cathode portion (4), wherein the heat exchanger (7) is situated directly downstream of the cathode portion (4) and is in fluid communication with the cathode portion (4) by means of a cathode exhaust gas line (9) in order for the cathode exhaust gas to be fully conducted through the heat exchanger (7), a cathode supply gas line (19) for the supply of cathode supply gas to the cathode portion (4) is provided upstream of the cathode portion (4), a cathode exhaust gas start-up burner (11) and/or a cathode supply gas start-up burner (12) is provided for the adjustable supply of a heating fluid into the cathode exhaust gas line (9) and/or the cathode supply gas line (19), a start-up burner (10) is provided for the adjustable supply of a heating fluid to the afterburner (8), wherein the afterburner (8) is arranged separately from and at a distance from the reformer-heat exchanger (5), and;

an adjustable supply adapted to feed a heating fluid for controlling a temperature of the fuel cell system (1*c*), wherein the adjustable supply is adapted to feed the heating fluid (a) through the cathode exhaust gas start-up burner (11) into the cathode exhaust gas line (9), and/or (b) through the cathode supply gas start-up burner (12) into the cathode supply gas line (19) depending on a determined temperature of the reformer (6).

* * * * *